United States Patent Office 3,359,243
Patented Dec. 19, 1967

3,359,243
LINEAR POLYUREA ELASTOMERS
Gaspard X. Criner, Cary, N.C., assignor to Monsanto Company, a corporation of Delaware
No Drawing. Filed Dec. 15, 1964, Ser. No. 418,551
9 Claims. (Cl. 260—77.5)

ABSTRACT OF THE DISCLOSURE

The invention is directed to synthetic, linear elastomers containing urea linkages only. The elastomers are produced by reacting a poly(oxyalkylene) diamine with an aromatic diisocyanate and thereafter extending the prepolymer product with a diamine.

---

Elastomers of this general type have recently found wide application in the manufacture of elastic fibers, filaments, and films. That is, polymers typified structurally by the presence of a low-melting or "soft" polymer segment joined by urethane linkage to a high-melting or "hard" segment are known to provide an elastic property to fibers when they are produced from these polymeric materials. These elastomers heretofore known, called spandex polymers, contain both urethane and urea linkages with the urethane linkages generally accounting for at least 85 percent of the total number of linkages in the polymer.

Although elastic fibers obtained from previously known segmented polymers of the above type have many advantageous properties and much to commend them, there has been a continuing search to develop similar fibers which have a desired combination of advantageous properties. As noted above, the elastomers, heretofore known, all contain a substantial amount of urethane linkages and fiber-forming elastomers which contain only urea linkages have been unknown to the art.

It is an object of this invention to provide a synthetic fiber-forming linear polyurea elastomer.

It is a further object of this invention to provide a synthetic fiber-forming linear polyurea elastomer substantially free from urethane linkages.

It is still a further object of this invention to provide a process for producing a synthetic fiber-forming linear polyurea elastomer.

Other objects will appear as the description of this invention proceeds.

These and other objects are accomplished by providing a synthetic fiber-forming linear polyurea elastomer which is composed of segmented polymers consisting of a plurality of intra-linear structural units having the formula:

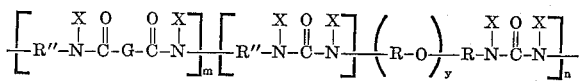

wherein R" is an aromatic radical selected from the group consisting of phenylene, alkyl phenylene, biphenylene and alkylene biphenyl, R is an alkylene radical containing 2 to 10 carbon atoms, X is a member of the group consisting of hydrogen and lower alkyl radicals, $m$, $n$, and $y$ are integers greater than zero and G is a divalent radical selected from the group consisting of

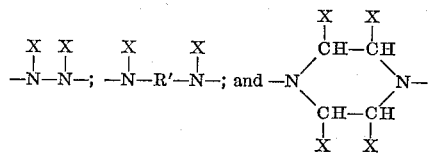

wherein R' is a divalent organic radical containing 2 to 20 carbon atoms, and X is as defined above.

As has been noted, elastomers, including those of the present invention, are composed of "soft" segments and "hard" segments alternating in the polymer chain. The "soft" segment is composed of a residue on removal of one of the hydrogens from the amine group of a poly(oxyalkylene) diamine having a melting point below about 60° C. and a molecular weight in the range of about 600 to 5000. This segment is connected through urea linkages to a second or "hard" segment which constitutes at least one repeating unit of a urea polymer having a melting point of about 200° C. when in a molecular weight above about 10,000. It is in the novel employment of a urea linkage to link the "soft" and "hard" segments of the elastomer, thus providing an elastomer with substantially no urethane linkages that is the novel feature of the present invention.

The synthetic linear fiber-forming polyurea elastomers of the present invention are prepared in the following manner. A lower molecular weight poly(oxyalkylene) diamine is first reacted with an aromatic diisocyanate to produce the isocyanate-terminated "prepolymer" or "soft" segment. The diisocyanate is employed in molar excess over the amine-terminated polymer. That is, a molar ratio of from 3.0:1.0 to 1.5:1.0 with 2.1:1.0 being preferred. This isocyanate-terminated, or "capped" polymeric intermediate is then reacted with a diamine extender to form that portion of the resulting polymer which constitutes the "hard" segment.

The reactions employed to form these polymers are carried out at moderate temperatures. The reaction of the diisocyanate with the poly(oxyalkylene) diamine may be carried out by admixing the anhydrous reagents at room temperature. While this reaction will proceed at room temperatures, it is sometimes desirable to employ slightly higher temperatures, i.e., between 60° and 85° C., in order to insure complete reaction. The polymerization of the isocyanate-terminated polyether with the diamine extender is generally carried out at the same temperatures as employed for the "capping" reaction.

Various methods of polymerization may be used in the reaction of the isocyanate-terminated prepolymer with the diamine, for example, bulk, inter-facial or solution techniques may be employed. However, solution polymerization is the preferred method. This is also true in regards to the initial reaction between the poly(oxyalkylene) diamine and the aromatic diisocyanate. The solvent employed is one which is relatively inert to the reactants. Suitable solvents include N,N-dimethylformamide, N,N-dimethylacetamide, tetrahydrofuran, and dimethylsulfoxide. Dimethylformamide and dimethylacetamide are preferrred especially since solutions available for the spinning of fibers may be made directly in these solvents.

As indicated above, the "soft" segments of the elastomeric polyurea are derived from a amine-terminated polymeric compound which may be represented by the formula

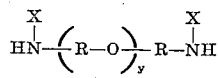

wherein R, X, and $y$ are as defined above. Essential features are that the compound be difunctional, have a melting point below about 60° C. and a molecular weight in the range of about 600 to 5000 with from 750 to 3500 being preferred. Representative poly(oxyalkylene) diamines which are represented by this formula are poly(oxyethylene) diamine, poly(oxypropylene) diamine, poly(oxytetramethylene) diamine, poly(oxypentamethylene) diamine, poly(oxyhexamethylene) diamine, poly(oxyheptamethylene) diamine, poly(oxyoctamethylene) diamine, poly(oxynonamethylene) diamine, poly(oxydecamethylene) diamine, and the like.

As diisocyanates, there may be employed the aromatic diisocyanates of the phenylene, alkyl phenylene and alkylene biphenyl types. Suitable diisocyanates are, for example, m-phenylene diisocyanate, p-phenylene diisocyanate, toluene diisocyanate, 4,4'-diphenylene diisocyanate, 4,4'-diphenyl dimethyl methane diisocyanate, p,p'-isopropylidene diphenyl diisocyanate, and p,p'-methylene diphenyl diisocyanate. The preferred diisocyanates are 4,4'-diphenyl methane dissocyanate and 2,4-toluene diisocyanate.

The diamine extenders which may be used in the production of the novel elastomers of the present invention are those which are conventionally used in the art and may be represented by any one of the following formulas:

$$\begin{array}{c} X \quad X \\ | \quad | \\ HN-NH \end{array}$$

$$\begin{array}{c} X \quad X \\ | \quad | \\ HN-R'-N-H \end{array}$$

and

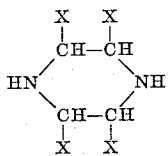

wherein X and R' are as defined above. Typical suitable diamine extenders are, for example, hydrazine, ethylene diamine, tetramethylene diamine, hexamethylene diamine, phenylene diamine, piperazine, dimethyl piperazine, tetramethyl piperazine, diethyl piperazine, and the like. The amount of diamine extenders which is used to react with the "capped" prepolymer should be in an approximately 1:1 molar ratio to the amount of amine-terminated polymer used to react with the diisocyanate, plus an amount sufficient to react with any excess diisocyanate that might exist in the prepolymer.

It is the reaction between the poly(oxyalkylene) diamine and the diisocyanate that forms a urea linkage between the "soft" and "hard" segments of the elastomeric polyureas of this invention. As has been noted, the "hard" segment is formed by reacting the isocyanate terminated prepolymer compound with a diamine extender to form a polymer having all urea linkages. The preferred length of the "hard" segment depends upon the melting point of the segment and to some extent upon the molecular weight of the "soft" segment. The length of the "hard" segment may be controlled by adding additional amounts of diisocyanate together with the diamine extender in the chain-extending reaction. To produce polymers which are elastomers at room temperatures, it is ordinarily required that the "soft" segments comprise from about 60 to 95 percent by weight of the polymeric product and that the "hard" segment in a range of about 5 to 40 percent by weight.

The elastomeric polyureas of this invention should have a specific viscosity above 0.18, that is, the molecular weight should be in the fiber-forming range of 10,000 or above. Specific viscosity is defined as $$\eta_{sp} = \frac{\eta - \eta_o}{\eta^o} - 1$$

wherein $\eta$ is the viscosity of 0.2 gram of polymer in 100 ml. of dimethylformamide solution at 25° C., $\eta_o$ is the viscosity of the pure solvent at the same temperatures and $\eta_{sp}$ is the specific viscosity.

Filaments can be prepared from these polymers by dry or wet spinning methods. Conventional conditions are used when employing either method except that spinning speeds are usually lower than those normally applied in spinning other textile filaments. The preferred solvents for wet spinning are N,N-dimethylformamide and N,N-dimethlyacetamide, and these solutions are usually extruded into a hot water bath.

A drying operation is usually not necessary to develop satisfactory elastic properties in the filaments of this invention. However, the overall properties of the filaments are often improved by a drying operation with results in increased orientation and/or crystallinity in the final structure.

The following specific examples are presented for illustrative purposes only and are not to be construed in any way as limiting.

Example I 77.22 grams of a amine-terminated polypropylene glycol having a molecular weight of 2000 was dissolved in 100 grams of dimethylformamide. To this solution, another solution of 18.15 grams of 2,4-toluene diisocyanate dissolved in 150 grams of dimethylformamide was added slowly with stirring over a 10-minute period. During the addition, the temperature was maintained at 80° C. and after the addition was completed, the solution was held at this temperature and stirred for an additional 15 minutes before being cooled to room temperature. To this solution there was added a solution of 4.63 grams of 2,5-dimethylpiperazine in 50 grams of dimethylformamide over a period of 15 minutes with vigorous agitation. The solution became viscous and was then stirred for 30 minutes while holding the temperature at 80° C. The thus prepared dope was extruded through a spinneret into a water coagulating bath. The fibers produced had an elongation in excess of 400 percent and a melting point in a range of 175° C. to 200° C.

Example II 2.5 grams of p,p'-diphenylmethane diisocyanate was dissolved in 25 ml. of dimethylformamide and the solution heated to 80° C. To this solution, another solution of 5 grams of poly(oxypropylene) diamine (M.W. 1000) in 20 ml. of dimethylformamide, was added dropwise over a 10-minute period. The reactants were then stirred for 5 minutes and 0.60 gram of trans-2,5-dimethylpiperazine in 15 ml. of dimethylformamide slowly added. A viscous solution formed from which elastomeric films could be cast having the following properties: elongation, 677 percent; tenacity, 0.264 gram per denier, and melting point, 182° C.

Example III 4.5 grams of p,p'-diphenylmethane diisocyanate was dissolved in 35 ml. of dimethylformamide and the solution heated to 80° C. To this solution was added, over a 10-minute period, another solution consisting of 10 grams of poly(oxypropylene) diamine (M.W. 2000) in 25 ml. of dimethylformamide. The reactants were stirred for 15 minutes, cooled to room temperature, placed in a blender and a solution of 0.57 gram trans-2,5-dimethylpiperazine in 20 ml. of dimethylformamide added all at once with rapid agitation. A viscous solution was formed and this was agitated an additional 5 minutes to insure complete reaction. Films were cast from the viscous dope and had the following properties: elongation, 698 percent; tenacity, 0.161 gram per denier.

As is quite apparent, the fiber-forming elastomers of this invention find their greatest usefulness in the manufacture of fabrics and garments when elastic quality is desired. They may be employed in these end uses as uncovered filaments or they may be covered, as rubber, in such applications. They have many advantages over rubber threads. For example, they may be spun readily into multi-filament yarns and into low-denier filaments. Furthermore, they may be dyed by common dye stuffs and have a good resistance to perspiration or greases and many other common chemicals.

It will be apparent that many widely different embodiments of this invention may be made without departing from the spirit or scope thereof, and, therefore, it is not

I claim:

1. A synthetic, fiber-forming, linear, polyurea elastomer consisting essentially of a plurality of intra-linear structural units having the formula

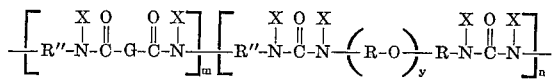

wherein R″ is an aromatic radical selected from the group consisting of phenylene, alkyl phenylene, biphenylene and alkylene biphenyl, R is an alkylene radical containing 2 to 10 carbon atoms, X is a member of the group consisting of hydrogen and lower alkyl radicals, $m$, $n$, and $y$ are integers greater than zero and G is a divalent radical selected from the group consisting of

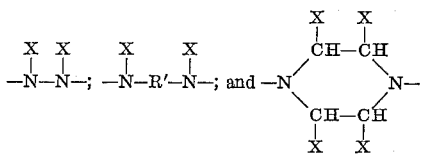

wherein R′ is a divalent organic radical containing 2 to 20 carbon atoms.

2. The synthetic, fiber-forming, linear, polyurea elastomer of claim 1 wherein the segment of the elastomer represented by

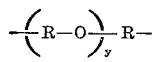

is a linear polyether radical having a molecular weight between about 750 and 3500.

3. The synthetic, fiber-forming, linear, polyurea elastomer of claim 1 wherein R″ is the aromatic radical

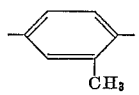

and R is propylene.

4. The synthetic, fiber-forming, linear, polyurea elastomer of claim 1 wherein R″ is the aromatic radical

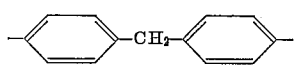

and R is propylene.

5. A process for producing a synthetic fiber-forming linear polyurea elastomer which comprises reacting a poly(oxyalkylene) diamine represented by the formula

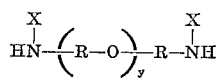

wherein R is an alkylene radical containing 2 to 10 carbon atoms, X is a member of the group consisting of hydrogen and lower alkyl radicals, and $y$ is an integer greater than zero, with an aromatic diisocyanate selected from the group consisting of phenylene diisocyanates, alkyl phenylene diisocyanates, biphenylene diisocyanates, and alkylene biphenyl diisocyanates to form a isocyanate terminated prepolymer, reacting the thus formed prepolymer with a diamine extender selected from the group consisting of diamines represented by a formula selected from the group consisting of

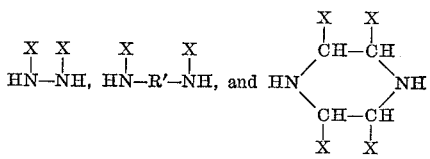

wherein X is as defined above and R′ is a divalent organic radical containing 2 to 20 carbon atoms, and recovering the elastomeric polyurea thus formed.

6. The process of claim 5 wherein the molar ratio of the aromatic diisocyanate to the poly(oxyalkylene) diamine is in the range of from 3.0:1.0 to 1.5:1.0.

7. The process of claim 5 wherein the poly(oxyalkylene) diamine is poly(oxypropylene) diamine.

8. A process for producing a synthetic, fiber-forming, linear polyurea elastomer which comprises reacting a poly(oxypropylene) diamine with 2,4-toluene diisocyanate in a molar ratio of diisocyanate to poly(oxypropylene) diamine of 2:1 to produce a isocyanate terminated prepolymer, reacting to thus formed prepolymer with 2,5-dimethylpiperazine in an amount equivalent to the amount of poly(oxypropylene) diamine employed, and recovering the elastomeric polyurea thus produced.

9. The process of claim 8 wherein the poly(oxypropylene) diamine and the 2,4-toluene diisocyanate are reacted in the form of a solution in dimethylformamide, and the 2,5-dimethylpiperazine is added in the form of a solution in dimethylformamide.

References Cited

UNITED STATES PATENTS 3,044,989   7/1962   Shivers _____ 260—77.5

DONALD E. CZAJA, *Primary Examiner.*

M. I. MARQUIS, *Assistant Examiner.*